US012424780B2

(12) United States Patent
Peterson et al.

(10) Patent No.: US 12,424,780 B2
(45) Date of Patent: Sep. 23, 2025

(54) POWER HARNESS

(71) Applicant: TE Connectivity Solutions GmbH, Schaffhausen (CH)

(72) Inventors: Kevin John Peterson, Kernersville, NC (US); Clara Marguerite Rhodes, Winston Salem, NC (US); Matthew Bryan Hitchcock, Hershey, PA (US); Aaron James de Chazal, Rochester, MI (US); Ram Kishore Venkatesan, Walkertown, NC (US)

(73) Assignee: TE Connectivity Solutions GmbH (CH)

( * ) Notice: Subject to any disclaimer, the term of this patent is extended or adjusted under 35 U.S.C. 154(b) by 313 days.

(21) Appl. No.: 18/324,384

(22) Filed: May 26, 2023

(65) Prior Publication Data

US 2024/0396241 A1 Nov. 28, 2024

(51) Int. Cl.

| | |
|---|---|
| ***H01R 12/78*** | (2011.01) |
| ***H01R 13/506*** | (2006.01) |
| ***H01R 13/512*** | (2006.01) |
| ***H01R 13/52*** | (2006.01) |

(52) U.S. Cl.

CPC ........... *H01R 12/78* (2013.01); *H01R 13/506* (2013.01); *H01R 13/512* (2013.01); *H01R 13/5202* (2013.01); *H01R 13/5221* (2013.01)

(58) Field of Classification Search

CPC .... H01R 12/78; H01R 13/506; H01R 13/512; H01R 13/5202; H01R 13/5221

USPC .......................................................... 439/275

See application file for complete search history.

(56) References Cited

U.S. PATENT DOCUMENTS 3,065,446 A * 11/1962 Langzettel ............. H01R 12/61 439/495
4,647,125 A * 3/1987 Landi ..................... H01R 12/61 439/67
4,975,068 A * 12/1990 Squires .................. H01R 12/78 439/372
5,730,619 A * 3/1998 Hamlin ................ H01R 13/193 439/573
6,077,090 A * 6/2000 Campbell .......... H01R 12/7082 439/67
6,165,009 A * 12/2000 Anbo ..................... H01R 31/02 439/379
6,299,469 B1 * 10/2001 Glovatsky ........ F02M 35/10144 439/329
6,719,584 B1 * 4/2004 Favro ................ H01R 13/5208 439/499

(Continued)

*Primary Examiner* — Harshad C Patel

(57) ABSTRACT

A power harness includes a cable having a ring insert received in an opening electrically connected to the cable body and having a cable seal sealed to the flat cable. The power harness includes a housing having a chamber with a cable slot and a bore passing through a hub. The power harness includes a threaded bolt received in the hub passing through the ring insert to threadably couple to a mating harness. The threaded bolt includes an insulating cover on the head and an insulating cap extending from the threaded shaft. The threaded bolt includes a bolt seal sealed to the housing. The power harness includes a contact ring received in the hub aligned with the ring insert with an opening that receives the threaded bolt. A first end engages and is electrically connected to the ring insert and a second end is electrically connected to the mating harness.

20 Claims, 7 Drawing Sheets

(56) References Cited

U.S. PATENT DOCUMENTS

| | | | | |
|---|---|---|---|---|
| 6,722,915 | B1 * | 4/2004 | McAlonis | H01R 12/721 439/493 |
| 7,131,861 | B2 * | 11/2006 | Aeschbacher | H05K 3/365 439/495 |
| 7,140,897 | B2 * | 11/2006 | Axenbock | H01R 13/521 439/271 |
| 7,223,105 | B2 * | 5/2007 | Weiss | H01R 13/2414 439/497 |
| 7,341,476 | B2 * | 3/2008 | Soeta | H01R 12/61 439/493 |
| 7,387,537 | B1 * | 6/2008 | Daily | H01R 13/6272 439/282 |
| 7,503,794 | B2 * | 3/2009 | Haller | H01R 13/633 439/357 |
| 7,753,710 | B2 * | 7/2010 | George | H01R 13/635 439/352 |
| 8,251,712 | B2 * | 8/2012 | Cheng | H01R 12/73 439/329 |
| 8,529,277 | B2 * | 9/2013 | Williams | H01R 13/5208 439/655 |
| 9,190,791 | B1 * | 11/2015 | Jaena | H01R 25/162 |
| 9,270,052 | B1 * | 2/2016 | Martin | H01R 13/6315 |
| 9,685,730 | B2 * | 6/2017 | Jones | H02G 3/0493 |
| 10,149,980 | B2 * | 12/2018 | Shah | H01R 13/2421 |
| 2012/0178270 | A1 * | 7/2012 | McElroy | H01R 13/6205 439/39 |

* cited by examiner

POWER HARNESS

BACKGROUND OF THE INVENTION

The subject matter herein relates generally to power connectors.

Power connectors are used to electrically connect various electrical components, such as to deliver power from one component to another component. For example, in an electric vehicle, power connectors may be used to electrically connect the battery of the vehicle with another component, such as an electric motor of the vehicle. Some known systems use flat cables or busbars for high voltage power transmission. However, connection between the flat cables may be difficult. For example, when used in electric vehicles, the connection is susceptible to vibration and deterioration from the environment, such as moisture or debris.

A need remains for a robust and reliable power connector system, such as for electric vehicles.

BRIEF DESCRIPTION OF THE INVENTION

In one embodiment, a power harness is provided and includes a flat cable having a cable body extending to a terminating end. The flat cable includes an opening and a ring insert received in the opening. The ring insert is electrically connected to the cable body. The flat cable includes a cable seal surrounding and is sealed to the flat cable. The flat cable includes a cable seal cap holding the cable seal on the terminating end of the cable body. The power harness includes a housing having a chamber that includes a cable slot and a hub with a bore passing through the housing. The cable slot receives the terminating end of the flat cable. The ring insert is aligned with the bore. The housing has a mating end configured to be mated with a mating harness of the power harness. The power harness includes a threaded bolt received in the hub and passes through the bore. The threaded bolt passes through the ring insert to threadably couple to the mating harness. The threaded bolt includes a head and a threaded shaft. The threaded bolt includes an insulating cover on the head. The threaded bolt includes an insulating cap at a distal end of the threaded shaft. The threaded bolt includes a bolt seal sealed between the threaded bolt and the housing. The power harness includes a contact ring received in the hub and aligned with the ring insert in the bore. The contact ring has an opening between a first end and a second end. The first end engages and is electrically connected to the ring insert. The second end configured to be electrically connected to the mating harness. The power harness includes a mating seal configured to seal between the housing and the mating harness.

In another embodiment, a power harness is provided and includes a flat cable having a cable body extending to a terminating end. The flat cable includes an opening and a ring insert received in the opening. The ring insert is electrically connected to the cable body. The flat cable includes a cable seal surrounding and is sealed to the flat cable. The flat cable includes a cable seal cap holding the cable seal on the terminating end of the cable body. The power harness includes a housing having a chamber that includes a cable slot and a hub with a bore passing through the housing. The cable slot receives the terminating end of the flat cable. The ring insert is aligned with the bore. The housing has a mating end configured to be mated with a mating harness of the power harness. The power harness includes a socket insert received in the hub and passes through the bore. The socket insert passes through the ring insert. The socket insert includes a threaded bore configured to be threadably coupled to a threaded bolt of the mating harness. The socket insert includes an insulating cap at a distal end of socket insert. The power harness includes a contact ring received in the hub and aligned with the ring insert in the bore. The contact ring has an opening between a first end and a second end. The first end engages and is electrically connected to the ring insert. The second end is configured to be electrically connected to the mating harness. The power harness includes a cover coupled to the hub and holds the socket insert in the housing. The cover includes a cover seal sealing coupled to the housing to seal the bore from the external environment.

In a further embodiment, a power harness is provided and includes a first harness connector including a first housing having a first hub with a first bore passing through the first housing. The first harness connector includes a first flat cable that has a terminating end received in the first housing. The first harness connector includes a first cable seal sealed to the first housing and the first flat cable at the terminating end. The first harness connector includes a threaded bolt received in the first hub and passes through the first bore. The threaded bolt includes an insulating cover covering a head and an insulating cap at a distal end of a threaded shaft. The first harness connector includes a bolt seal sealed between the threaded bolt and the first housing. The first harness connector includes a first contact ring received in the first hub and electrically connected to the first flat cable. The power harness includes a second harness connector coupled to the first harness connector. The second harness connector includes a second housing that has a second hub with a second bore passing through the second housing. The second harness connector includes a second flat cable having a terminating end received in the second housing. The second harness connector includes a second cable seal sealed to the second housing and the second flat cable at the terminating end. The second harness connector includes a socket insert received in the second hub and passes through the second bore. The socket insert includes a threaded bore threadably coupled to the threaded bolt of the first harness connector. The socket insert includes an insulating cap at a distal end of socket insert. The second harness connector includes a second contact ring received in the second hub and electrically connected to the second flat cable. The second harness connector includes a cover coupled to the second hub and holding the socket insert in the second housing. The cover includes a cover seal sealing coupled to the second housing to seal the second bore from the external environment. The power harness includes a mating seal sealed between the first housing and the second housing at a mating interface between the first and second harness connectors.

DETAILED DESCRIPTION OF THE INVENTION

Figure 1:
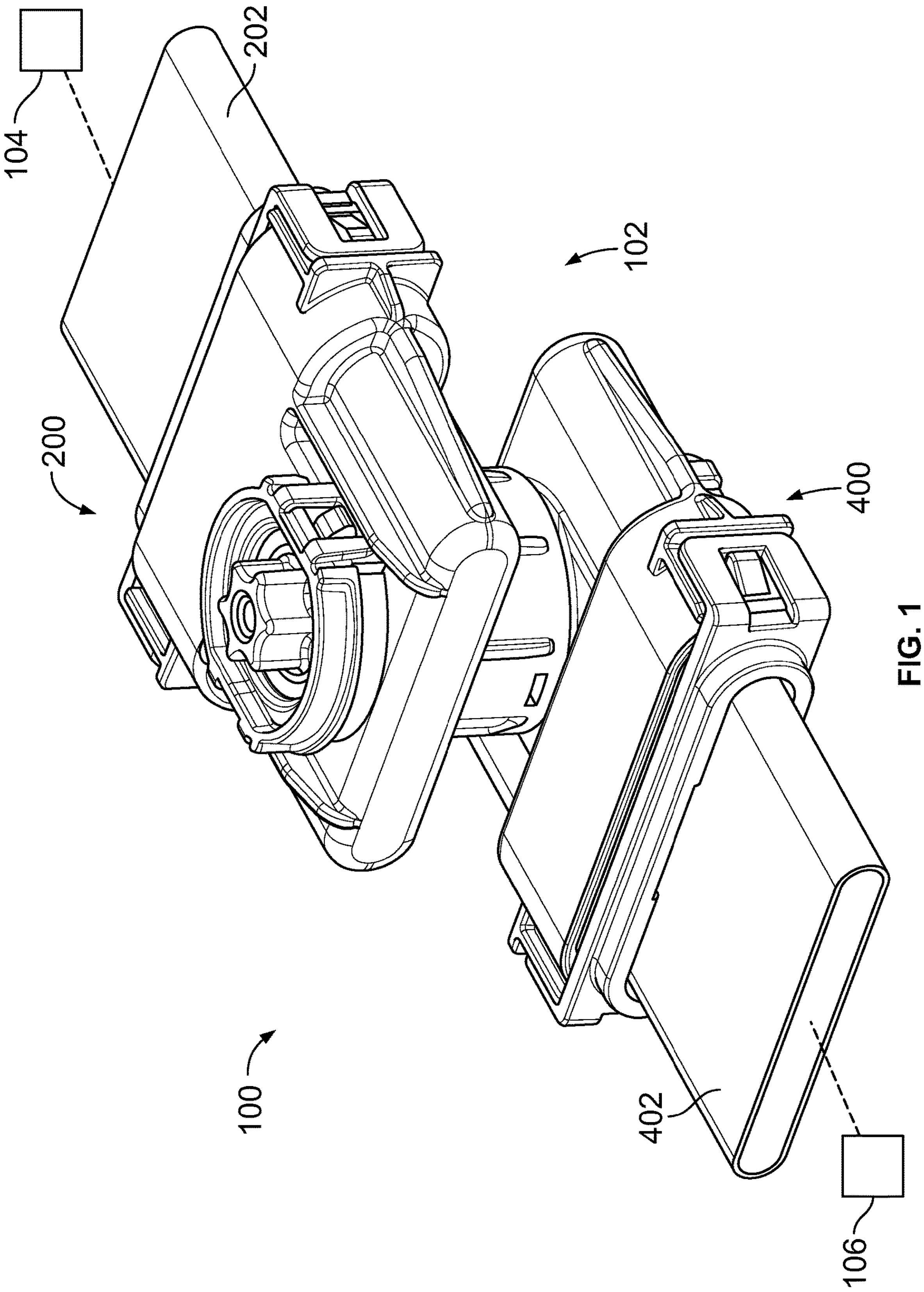
FIG. 1 is a top perspective view of a power system having a power harness in accordance with an exemplary embodiment.
Figure 2:
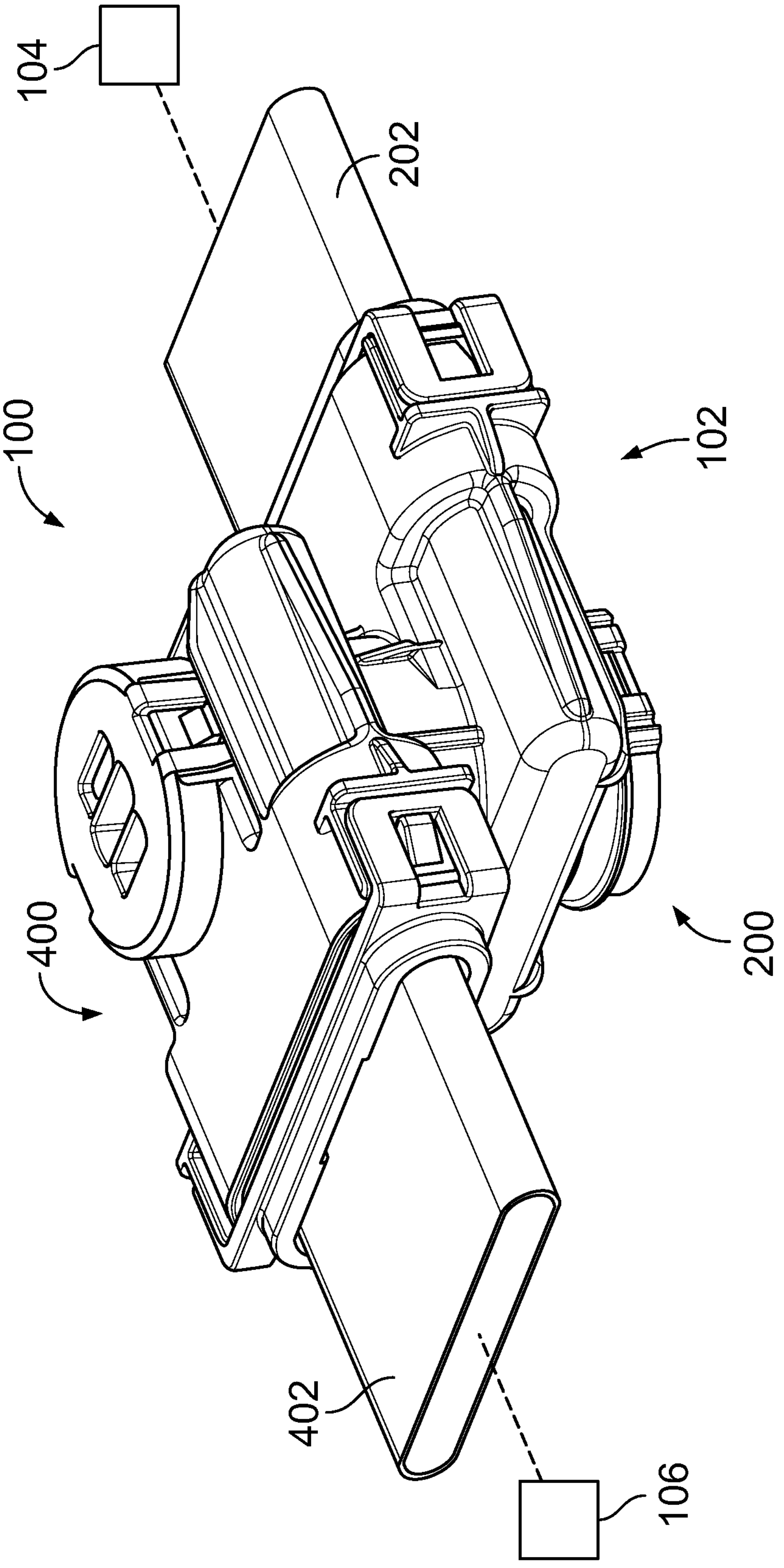
FIG. 2 is a bottom perspective view of the power harness in accordance with an exemplary embodiment.

FIG. 1 is a top perspective view of a power system 100 having a power harness 102 in accordance with an exemplary embodiment. FIG. 2 is a bottom perspective view of the power harness 102 in accordance with an exemplary embodiment. The power harness 102 includes power connectors provided in line between a first component 104 and a second component 106. For example, the power harness 102 includes a first harness connector 200 and a second harness connector 400. The harness connectors 200, 400 are provided at ends of power cables 202, 402, respectively, extending from the components 104, 106. The harness connectors 200, 400 provide a separable interface in the power transmission line between the first and second components 104, 106.

In various embodiments, the power system 100 may be part of a vehicle, such as an electric vehicle. The first component 104 may be a battery of the vehicle and the second component 106 may be a powered device of the vehicle, such as a motor. In various embodiments, one of the harness connectors 200 or 400 may be provided on the chassis of the vehicle while the other harness connector 200 or 400 may be provided on the cab of the vehicle in the connection may be made when the cab is mounted to the frame of the vehicle. In other various embodiments, one of the harness connectors 200 or 400 may be provided on the vehicle while the other harness connector 200 or 400 may be provided on another vehicle or another component, such as a trailer being towed by the vehicle. The power harness 102 may be used to connect other types of components in alternative embodiments. The power system 100 may be used in other applications other than electric vehicles in alternative embodiments.

In an exemplary embodiment, the first and second harness connectors 200, 400 are connected using threaded fasteners, such as a threaded bolt received in a threaded insert to mechanically and electrically connect the first and second power cables 202, 402. In an exemplary embodiment, the harness connectors 200, 400 are compact occupied not much more space (for example, height and/or width and/or length) than the corresponding power cables 202, 402. In an exemplary embodiment, the harness connectors 200, 400 form a sealed interface between the power cables 202, 402. For example, the harness connectors 200, 400 are sealed to the power cables 202, 402 and one or more environmental seals are provided at the interface between the harness connectors 200, 400 to seal the separable interface between the harness connectors 200, 400. The threaded fasteners may additionally be sealed within the harness connectors 200, 400. In an exemplary embodiment, the harness connectors 200, 400 are touch safe, wherein any and all live conductive elements are insulated to prevent short circuiting, a parking, or injury from touching the live element. The harness connectors 200, 400 are touch safe both in the mated conditions in the unmated condition. In an exemplary embodiment, the harness connectors 200, 400 are vibration resistant to maintain a reliable electrical connection along the power transmission line. In an exemplary embodiment, the harness connectors 200, 400 may be mated at various orientations relative to each other. For example, the power cables 202, 402 may extend away from the connection at different angles, such as 180°, 90° or at other angles. Optionally, the harness connectors 200, 400 may be designed for 360° mating to allow the power cables 202, 402 to extend in any direction. However, in alternative embodiments, the harness connectors 200, 400 may have a single mating orientation. While a single interface is illustrated in FIGS. 1 and 2, the harness connectors 200, 400 may have multiple interfaces.

Figure 3:
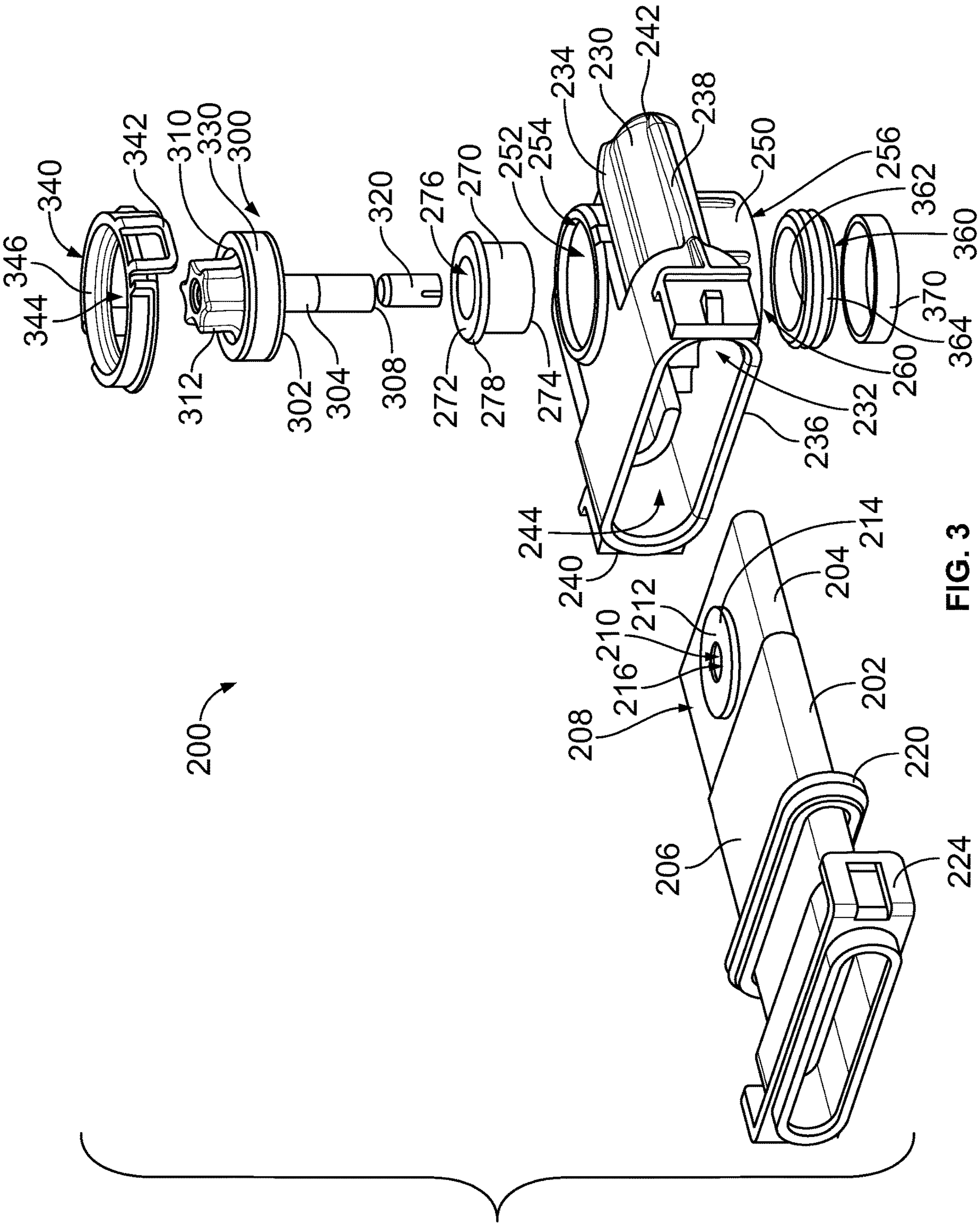
FIG. 3 is an exploded view of the first harness connector in accordance with an exemplary embodiment.

FIG. 3 is an exploded view of the first harness connector 200 in accordance with an exemplary embodiment. The first harness connector 200 includes the power cable 202, a housing 230, a contact ring 270, and a threaded bolt 300. The housing 230 receives the power cable 202, the contact ring 270, and the threaded bolt 300. The housing 230 is configured to be mated with the second harness connector 400 (shown in FIGS. 1 and 2). The threaded bolt 300 is used to mechanically connect the first harness connector 200 to the second harness connector 400. The contact ring 270 is used to electrically connect the power cable 202 to the second harness connector 400.

In an exemplary embodiment, the power cable 202 is a flat cable, and may be referred to hereinafter as flat cable 202. The flat cable 202 may be manufactured from braided metal tapes that are flat rolled. For example, the braided metal tapes may be aluminum or copper. In alternative embodiments, the flat cable 202 may be a metal plate or bar, such as a busbar. The flat cable 202 may be generally rectangular in cross-section, such as having generally planar top and bottom surfaces. However, the outer edges of the flat cable 202 may be curved in various embodiments. In various embodiments, the flat cable 202 has a width that is at least twice a height of the flat cable 202. Optionally, the flat cable 202 may have a width that is four times the height, or more. In alternative embodiments, the power cable 202 may be round rather than being flat.

The flat cable 202 includes a cable body 204 and a jacket 206 surrounding the cable body 204. The jacket 206 is made from a dielectric or other insulating material to make the flat cable 202 touch safe. In an exemplary embodiment, the cable body 204 is exposed at a terminating end 208 of the flat cable 202. The flat cable 202 includes an opening 210 at the terminating end 208. A ring insert 212 is received in the opening 210. The ring insert 212 is electrically connected to the cable body 204. The ring insert 212 is configured to be coupled to the contact ring 270 when assembled to form a direct electrical path between the contact ring 270 and the cable body 204. Optionally, the ring insert 212 includes a flange 214 along the upper surface and/or the lower surface of the cable body 204. In various embodiments, the ring insert 212 is manufactured from a different metal or metal alloy than the cable body 204. For example, the cable body 204 may be aluminum and the ring insert 212 may be copper. The ring insert 212 includes an opening 216 passing through the center of the ring insert 212. The opening 216 is configured to receive the threaded bolt 300.

In an exemplary embodiment, the flat cable 202 includes a cable seal 220 surrounding the cable body 204 and the jacket 206. An inner surface of the cable seal 220 is configured to be sealed against the jacket 206 of the flat cable 202. The cable seal 220 may be a rubber material in various embodiments. An outer surface of the cable seal 220 is configured to be sealed to the housing 230. In an exemplary embodiment, the flat cable 202 includes a cable seal cap 222 surrounding the cable body 204 and the jacket 206. The cable seal cap 222 is used to position the cable seal 220 on the terminating end 208 of the flat cable 202. The cable seal cap 222 is used to retain the cable seal 220 in the housing 230. In an exemplary embodiment, the cable seal cap 222 includes latches 224 configured to be latchably coupled to the housing 230. A front portion of the cable seal cap 222 may be plugged into a portion of the housing 230.

The housing 230 is manufactured from a dielectric material, such as a plastic material. Optionally, the housing 230 may be an injection molded part. The housing 230 includes walls forming a chamber 232 that receives the flat cable 202, the contact ring 270, and the threaded bolt 300. In an exemplary embodiment, the housing 230 includes a top 234 and a bottom 236. The housing 230 includes sides 238 extending between a front 240 and a rear 242. The housing 230 includes an opening at the front 240 that defines a cable slot 244 providing access to the chamber 232. The flat cable 202 is received in the cable slot 244. In various embodiments, the cable slot 244 may be oriented generally horizontally. The cable seal cap 222 may be plugged into the cable slot 244 and coupled to the housing 230 at the front 240. The cable seal 220 may be sealed to the interior surface of the housing 230 at the cable slot 244.

In an exemplary embodiment, the housing 230 includes a hub 250 having a bore 252 passing through the hub 250. The bore 252 is open to and defines a portion of the chamber 232. In various embodiments, the hub 250 is generally cylindrical. However, the hub 250 may have other shapes in alternative embodiments. The bore 252 passes through the housing 230, such as along a vertical axis. In an exemplary embodiment, the flat cable 202 is positioned in the housing 230 with the ring insert 212 aligned with the bore 252, such as along the vertical axis, to receive the threaded bolt 300. The bore 252 includes an upper opening 254 and a lower opening 256. The threaded bolt 300 is received in the hub 250 and passes through the bore 252. For example, the threaded bolt 300 may pass through the upper opening 254 and/or the lower opening 256. The contact ring 270 is received in the hub 250. For example, the contact ring 270 may be loaded into the bore 252 through the upper opening 254. The threaded bolt 300 may be loaded into the bore 252 through the upper opening 254 above the contact ring 270.

The contact ring 270 extends between a first end 272 and a second end 274. The first end 272 may be a top of the contact ring 270 and the second end 274 may be a bottom of the contact ring 270. The contact ring 270 includes an opening passing through the contact ring 270 between the first end 272 and the second end 274. The opening 276 is configured to receive the threaded bolt 300. In an exemplary embodiment, the contact ring 270 includes a flange 278 at the first end 272. The flange 278 is used to position the contact ring 270 in the housing 230. For example, the contact ring 270 may be suspended in the bore 252 by the flange 278, which rests on a wall or surface of the housing 230. When assembled, the contact ring 270 is received in the hub 250 and aligned with the ring insert 212 of the flat cable 202 in the bore 252. For example, the opening 276 is aligned with the opening 216 along the vertical axis of the bore 252. The first end 272 of the contact ring 270 is configured to engage and electrically connect to the ring insert 212. The second end 274 is configured to engage and electrically connect to the second harness connector 400, such as a corresponding contact ring of the second harness connector 400. The threaded bolt 300 is configured to press the ring insert 212 into physical and electrical contact with the contact ring 270.

The threaded bolt 300 includes a head 302 and a threaded shaft 304 extending from the head 302. The threaded shaft 304 includes threads at a distal end 308 of the threaded shaft 304. In an exemplary embodiment, the threaded bolt 300 is touch safe. For example, the threaded bolt 300 includes an insulating cover 310 on the head 302 and an insulating cap 320 extending from the distal end 308 of the threaded shaft 304.

The insulating cover 310 may be overmolded on to the head 302. Alternatively, the insulating cover 310 may be pre-formed and snap-fit, press-fit, adhered, or otherwise secured to the head 302. The insulating cover 310 covers the head 302 to prevent touching of the metal or conductive portion of the threaded bolt 300. The insulating cover 310 includes drive features 312 for driving or rotating the threaded bolt 300. For example, the drive features 312 may be flat surfaces at the top of the insulating cover 310 that allow a socket wrench or other tool to rotate the threaded bolt 300 clockwise or counterclockwise for tightening or untightening the threaded bolt 300 during assembly with the second harness connector 400. Other types of drive features may be used in alternative embodiments, such as one or more slots to receive a screwdriver or other type of tool for tightening and untightening the threaded bolt 300.

The insulating cap 320 may be overmolded on to the threaded shaft 304. Alternatively, the insulating cap 320 may be pre-formed and snap-fit, press-fit, adhered, or otherwise secured to the distal end 308 of the threaded shaft 304. The insulating cap 320 covers the threaded shaft 304 to prevent touching of the metal or conductive portion of the threaded bolt 300.

In an exemplary embodiment, the first harness connector 200 includes a bolt seal 330 to seal between the threaded bolt 300 and the housing 230. In the illustrated embodiment, the bolt seal 330 is coupled to the insulating cover 310 at the head 302 of the threaded bolt 300. The outer surface of the bolt seal 330 is configured to be sealed to the housing 230, such as to the hub 250 when the threaded bolt 300 is received in the hub 250. For example, the bolt seal 330 may have a diameter equal to the diameter of the hub 250 at the upper opening 254.

In an exemplary embodiment, the first harness connector 200 includes a bolt retainer 340 to retain the threaded bolt 300 in the housing 230. The bolt retainer 340 may be coupled to the housing 230 outward of the threaded bolt 300, such as above the head 302 and the insulating cover 310. The bolt retainer 340 may be coupled to the hub 250. The bolt retainer 340 includes latches 342 configured to be latchably coupled to the housing 230 to secure the bolt retainer 340 to the housing 230. In an exemplary embodiment, the bolt retainer 340 includes an opening 344 to provide access to the threaded bolt 300, such as for engaging the drive features 312 to rotate the threaded bolt 300. However, in alternative embodiments, the bolt retainer 340 may be closed to prevent access to the threaded bolt 300. In an exemplary embodiment, the bolt retainer 340 includes one or more retaining features 346 to retain the threaded bolt 300 in the housing 230. In the illustrated embodiment, the retaining feature 346 is a lip or rim extending into the opening 344. The lip is configured to be seated above the head 302 and the insulating cover 310 to prevent removal of the threaded bolt 300 through the opening 344. Other types of retaining features may be used in alternative embodiments.

In an exemplary embodiment, the first harness connector 200 includes a mating seal 360 coupled to the housing 230 at a mating end 260 of the housing 230. In the illustrated embodiment, the mating end 260 is provided at the bottom 236. The mating end 260 is located at the lower opening 256 of the hub 250. The mating end 260 is configured to be mated with the second harness connector 400. In the illustrated embodiment, the mating seal 360 is cylindrical and configured to be plugged into the lower opening 256 of the hub 250 to seal against the hub 250. Optionally, an interior surface 362 of the mating seal 360 may be sealed to the hub 250 and an exterior surface 364 of the mating seal 360 is configured to seal to the second harness connector 400. However, in alternative embodiments, the exterior surface 364 may seal to the hub 250 and the interior surface 362 may seal to the second harness connector 400.

In an exemplary embodiment, the first harness connector 200 includes a seal retainer 370 to retain the mating seal 360 in the housing 230. The seal retainer 370 may be coupled to the housing 230 outward of the mating seal 360, such as below the bottom of the mating seal 360. The seal retainer 370 may be coupled to the hub 250. The seal retainer 370 includes latches 342 configured to be latchably coupled to the housing 230 to secure the seal retainer 370 to the housing 230.

Figure 4:
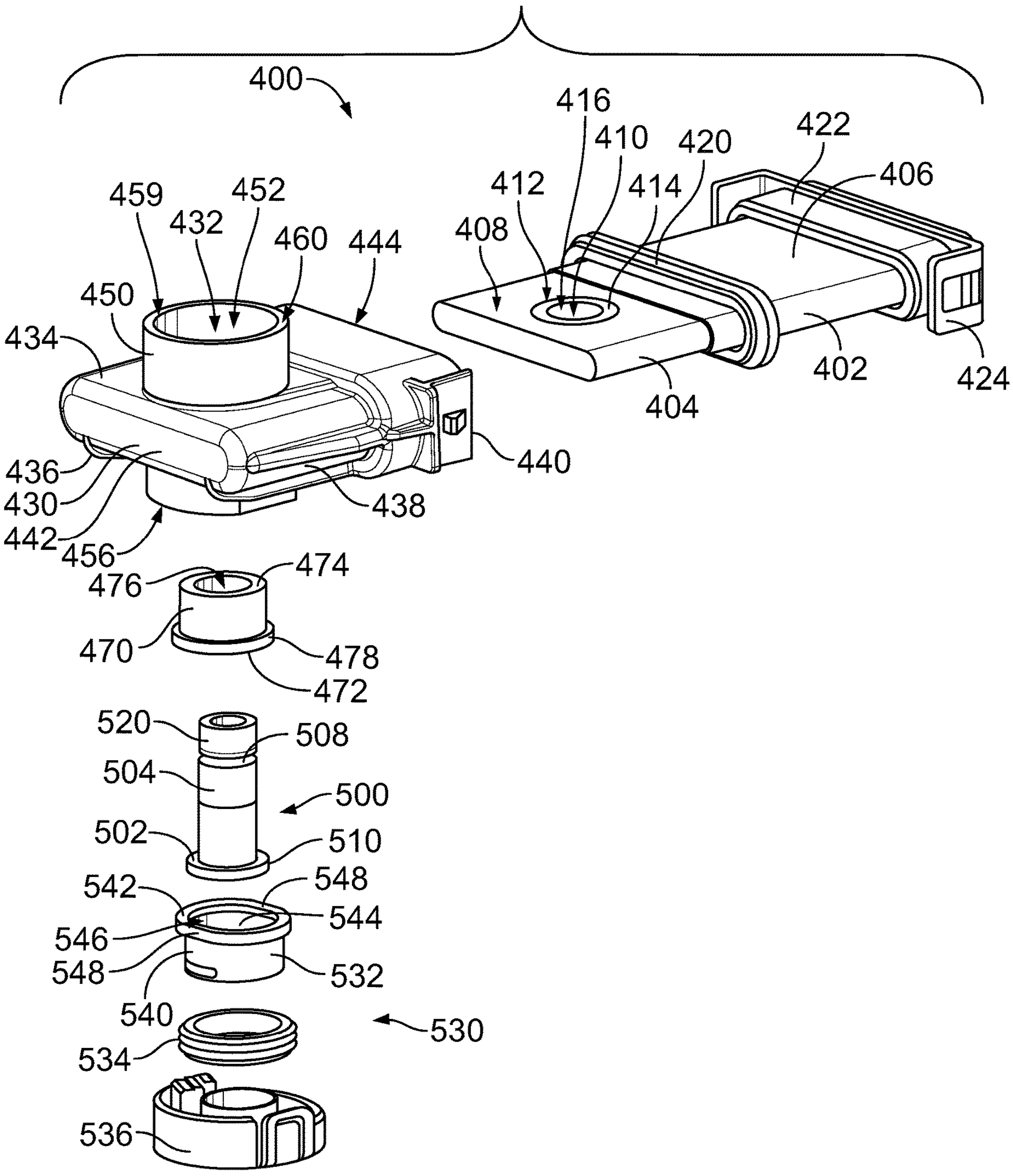
FIG. 4 is an exploded view of the second harness connector in accordance with an exemplary embodiment.

FIG. 4 is an exploded view of the second harness connector 400 in accordance with an exemplary embodiment. The second harness connector 400 includes the power cable 402, a housing 430, a contact ring 470, and a socket insert 500. The housing 430 receives the power cable 402, the contact ring 470, and the socket insert 500. The housing 430 is configured to be mated with the first harness connector 200 (shown in FIG. 3). The socket insert 500 is used to mechanically connect the second harness connector 400 to the first harness connector 200. For example, the socket insert 500 may be threadably coupled to the threaded bolt 300 (shown in FIG. 3). The contact ring 470 is used to electrically connect the power cable 402 to the first harness connector 200.

In an exemplary embodiment, the power cable 402 is a flat cable and may be referred to hereinafter as flat cable 402. The flat cable 402 may be identical to the flat cable 202 (FIG. 3), such as same material, same shape, same manufacturing technique, and the like. The flat cable 402 may be manufactured from braided metal tapes that are flat rolled. For example, the braided metal tapes may be aluminum or copper. In alternative embodiments, the flat cable 402 may be a metal plate or bar, such as a busbar. The flat cable 402 may be generally rectangular in cross-section, such as having generally planar top and bottom surfaces. However, the outer edges of the flat cable 402 may be curved in various embodiments. In various embodiments, the flat cable 402 has a width that is at least twice a height of the flat cable 402. Optionally, the flat cable 402 may have a width that is four times the height, or more. In alternative embodiments, the power cable 402 may be round rather than being flat.

The flat cable 402 includes a cable body 404 and a jacket 406 surrounding the cable body 404. The jacket 406 is made from a dielectric or other insulating material to make the flat cable 402 touch safe. In an exemplary embodiment, the cable body 404 is exposed at a terminating end 408 of the flat cable 402. The flat cable 402 includes an opening 410 at the terminating end 408. A ring insert 412 is received in the opening 410. The ring insert 412 is electrically connected to the cable body 404. The ring insert 412 is configured to be coupled to the contact ring 470 when assembled to form a direct electrical path between the contact ring 470 and the cable body 404. Optionally, the ring insert 412 includes a flange 414 along the upper surface and/or the lower surface of the cable body 404. In various embodiments, the ring insert 412 is manufactured from a different metal or metal alloy than the cable body 404. For example, the cable body 404 may be aluminum and the ring insert 412 may be copper. The ring insert 412 includes an opening 416 passing through the center of the ring insert 412. The opening 416 is configured to receive the socket insert 500.

In an exemplary embodiment, the flat cable 402 includes a cable seal 420 surrounding the cable body 404 and the jacket 406. An inner surface of the cable seal 420 is configured to be sealed against the jacket 406 of the flat cable 402. The cable seal 420 may be a rubber material in various embodiments. An outer surface of the cable seal 420 is configured to be sealed to the housing 430. In an exemplary embodiment, the flat cable 402 includes a cable seal cap 422 surrounding the cable body 404 and the jacket 406. The cable seal cap 422 is used to position the cable seal 420 on the terminating end 408 of the flat cable 402. The cable seal cap 422 is used to retain the cable seal 420 in the housing 430. In an exemplary embodiment, the cable seal cap 422 includes latches 424 configured to be latchably coupled to the housing 430. A front portion of the cable seal cap 422 may be plugged into a portion of the housing 430.

The housing 430 is manufactured from a dielectric material, such as a plastic material. Optionally, the housing 430 may be an injection molded part. The housing 430 includes walls forming a chamber 432 that receives the flat cable 402, the contact ring 470, and the socket insert 500. In an exemplary embodiment, the housing 430 includes a top 434 and a bottom 436. The housing 430 includes sides 438 extending between a front 440 and a rear 442. The housing 430 includes an opening at the front 440 that defines a cable slot 444 (shown in FIGS. 5 and 6) providing access to the chamber 432. The flat cable 402 is received in the cable slot 444. In various embodiments, the cable slot 444 may be oriented generally horizontally. The cable seal cap 422 may be plugged into the cable slot 444 and coupled to the housing 430 at the front 440. The cable seal 420 may be sealed to the interior surface of the housing 430 at the cable slot 444.

In an exemplary embodiment, the housing 430 includes a hub 450 having a bore 452 passing through the hub 450. The bore 452 is open to and defines a portion of the chamber 432. In various embodiments, the hub 450 is generally cylindrical. However, the hub 450 may have other shapes in alternative embodiments. The bore 452 passes through the housing 430, such as along a vertical axis. In an exemplary embodiment, the flat cable 402 is positioned in the housing 430 with the ring insert 412 aligned with the bore 452, such as along the vertical axis, to receive the socket insert 500. The bore 452 includes an upper opening 454 and a lower opening 456. The socket insert 500 is received in the hub 450 and passes through the bore 452. For example, the socket insert 500 may pass through the upper opening 454 and/or the lower opening 456. The contact ring 470 is received in the hub 450. For example, the contact ring 470 may be loaded into the bore 452 through the lower opening 456. The socket insert 500 may be loaded into the bore 452 through the lower opening 456 below the contact ring 470.

The contact ring 470 extends between a first end 472 and a second end 474. The first end 472 may be a bottom of the contact ring 470 and the second end 474 may be a top of the contact ring 470. The contact ring 470 includes an opening passing through the contact ring 470 between the first end 472 and the second end 474. The opening 476 is configured to receive the socket insert 500. In an exemplary embodiment, the contact ring 470 includes a flange 478 at the first end 472. The flange 478 is used to position the contact ring 470 in the housing 430. For example, the contact ring 470 may be loaded into the bore 452 until the flange 478 bottoms out against a wall or surface of the housing 430. When assembled, the contact ring 470 is received in the hub 450 and aligned with the ring insert 412 of the flat cable 402 in the bore 452. For example, the opening 476 is aligned with the opening 416 along the vertical axis of the bore 452. The first end 472 of the contact ring 470 is configured to engage and electrically connect to the ring insert 412. The second end 474 is configured to engage and electrically connect to the first harness connector 200. For example, the second end 474 may abut against the second end 274 of the contact ring 470 to create a direct electrical connection between the first and second contact rings 270, 470. The socket insert 500 is configured to press the ring insert 412 into physical and electrical contact with the contact ring 470.

The socket insert 500 includes a base 502 and a threaded tube 504 extending from the base 502. The threaded tube 504 includes internal threads inside the hollow bore of the threaded tube 504. The threaded tube 504 extends from the base 502 to a distal end 508. In an exemplary embodiment, the socket insert 500 is touch safe. For example, the socket insert 500 includes an insulating cap 520 extending from the distal end 508 of the threaded tube 504. The insulating cap 520 may be overmolded on to the threaded tube 504. Alternatively, the insulating cap 520 may be pre-formed and snap-fit, press-fit, adhered, or otherwise secured to the distal end 508 of the threaded tube 504. The insulating cap 520 covers the threaded tube 504 to prevent touching of the metal or conductive portion of the socket insert 500.

In an exemplary embodiment, the second harness connector 400 includes a cover assembly 530 coupled to the housing 430 to cover the socket insert 500. The cover assembly 530 includes a cover element 532, a cover seal 534 and a cover retainer 536. The cover element 532 and the cover seal 534 are configured to be received in the bore 452 of the hub 450. The cover element 532 is positioned below the socket insert 500 to hold the socket insert 500 in the bore 452.

The cover element 532 includes a main body 540, a flange 542 at the top of the main body 540, and a plug 544 extending from the top of the main body 540. The plug 544 is configured to be plugged into the end of the socket insert 500, such as into the base 502. The cover element 532 is used to hold the socket insert 500 in the housing 430. In an exemplary embodiment, the cover element 532 includes a pocket 546 at the top of the main body 540. The pocket 546 receives the base 502 of the socket insert 500. The flange 542 may surround the perimeter of the pocket 546.

In an exemplary embodiment, the cover element 532 includes one or more anti-rotation features 548 configured to interface with the socket insert 500 to hold a position of the socket insert 500 and resist rotation of the socket insert 500, such as during mating with the threaded bolt 300. In the illustrated embodiment, the anti-rotation features 548 include flat surfaces extending along the pocket 546. The anti-rotation feature 548 interface with complementary anti-rotation features 510 of the socket insert 500. For example, the base 502 may include one or more flat surfaces configured to interface with the flat surfaces of the anti-rotation features 548 to hold the rotational position of the socket insert 500 relative to the cover element 532. The anti-rotation features 548 may additionally interface with the hub 450 to resist rotation of the cover element 532 in the bore 452.

In an exemplary embodiment, the cover seal 534 is coupled to the outer surface of the main body 540 of the cover element 532. The cover seal 534 is sealed to the cover element 532. For example, an inner surface of the cover seal 534 is sealed to the cover element 532. An outer surface of the cover seal 534 is configured to be sealed to the housing 430, such as to the hub 450. For example, the cover seal 534 may have a diameter equal to the diameter of the hub 450 at the lower opening 456.

The cover retainer 536 is used to retain the cover element 532 in the housing 430. The cover retainer 536 may be coupled to the housing 430 outward of the socket insert 500 and the cover element 532, such as below the socket insert 500 and the cover element 532. The cover retainer 536 may be coupled to the hub 450. The cover retainer 536 may include latches configured to be latchably coupled to the housing 430 to secure the cover retainer 536 to the housing 430. The cover retainer 536 prevents access to the socket insert 500, making the second harness connector 400 touch safe.

Optionally, the second harness connector 400 may include a mating seal (not shown) coupled to the housing 430 at a mating end 460 of the housing 430. In the illustrated embodiment, the mating end 460 is provided at the top 434. The mating end 460 is located at the upper opening 454 of the hub 450. The mating end 460 is configured to be mated with the first harness connector 200. In the illustrated embodiment, the mating end 460 is cylindrical and configured to be plugged into the housing 230 of the first harness connector 200. The mating seal may be provided at the interior of the hub 450 or the exterior of the hub 450 for mating with the housing 230 of the first harness connector 200.

Figure 5:
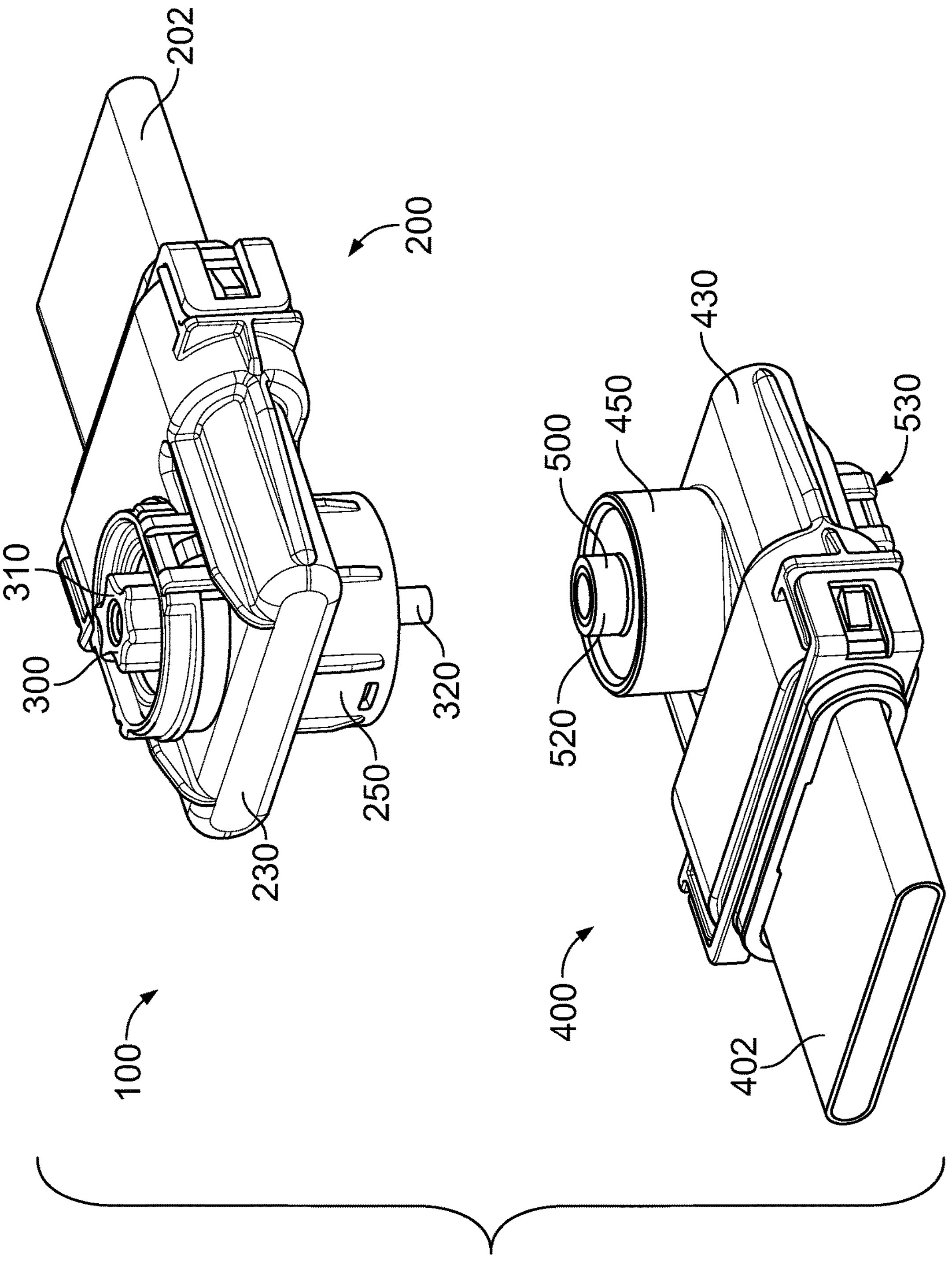
FIG. 5 is a top perspective view of the power system showing the first harness connector poised for mating with the second harness connector in accordance with an exemplary embodiment.
Figure 6:
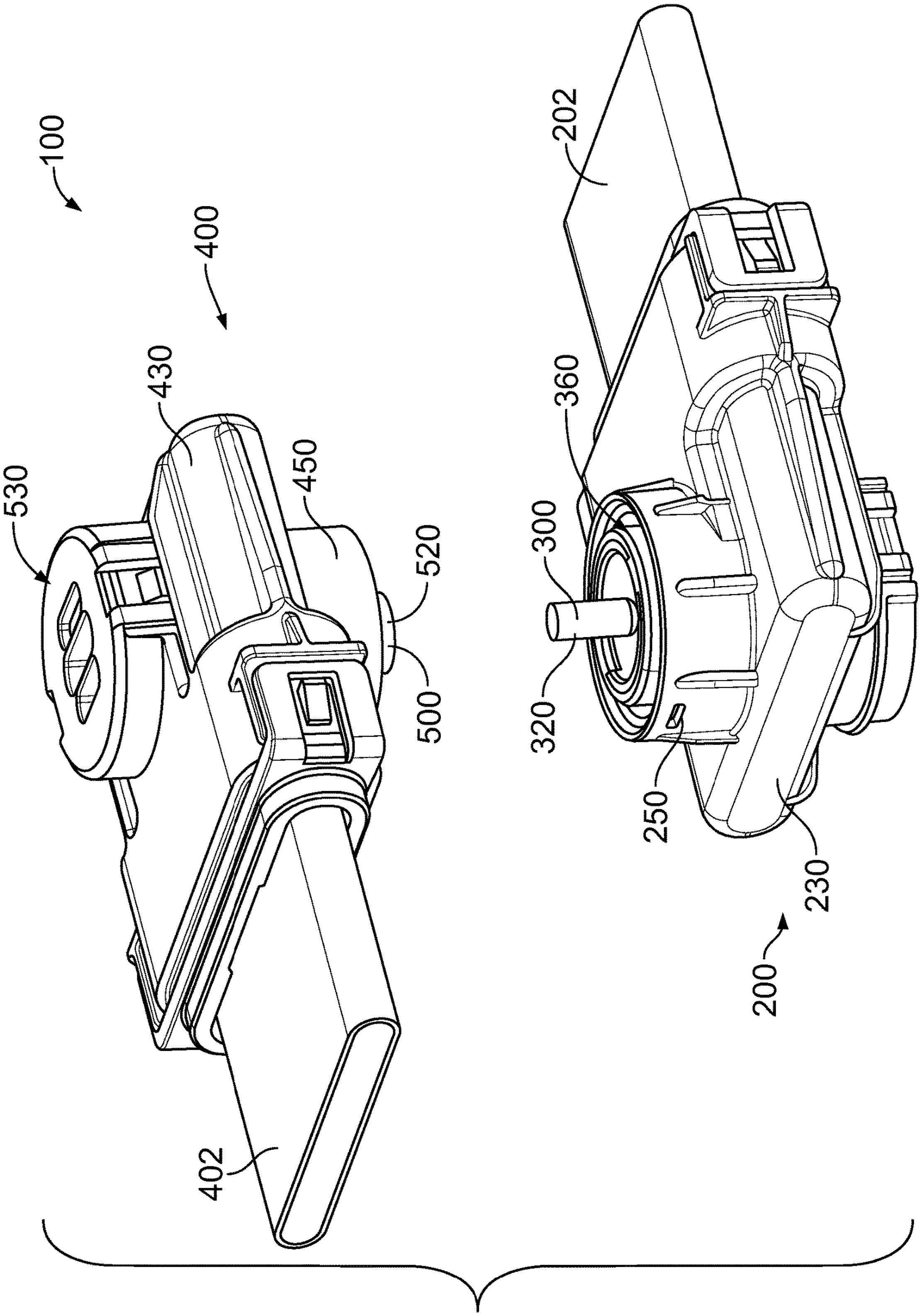
FIG. 6 is a bottom perspective view of the power system showing the first harness connector poised for mating with the second harness connector in accordance with an exemplary embodiment.

FIG. 5 is a top perspective view of the power system 100 showing the first harness connector 200 poised for mating with the second harness connector 400. FIG. 6 is a bottom perspective view of the power system 100 showing the first harness connector 200 poised for mating with the second harness connector 400. The first and second harness connectors 200, 400 are mated in a mating direction along a mating axis. The mating axis may be a vertical axis.

During mating, the threaded bolt 300 is aligned with the socket insert 500. The hub 250 of the first harness connector 200 is aligned with the hub 450 of the second harness connector 400. In an exemplary embodiment, the mating interfaces are cylindrical allowing mating at any angular orientation relative to each other. For example, the flat cables 202, 402 may extend in any angular direction. In the illustrated embodiment, the flat cables 202, 402 are oriented 180° relative to each other; however, the first harness connector 200 and/or the second harness connector 400 may be oriented at any other angular orientation and still be successfully connected. However, in alternative embodiments, the first harness connector 200 and/or the second harness connector 400 may include keying features for keyed mating at the mating interface. For example, the keyed mating may restrict mating to one or more particular orientations (for example, 180°, 90°, 45°, and the like).

During mating, the threaded bolt 300 is plugged into the socket insert 500. For example, the insulating cap 320 at the end of the threaded bolt 300 is plugged into the hollow bore of the threaded tube 504, such as through the insulating cap 520. When the threaded shaft 304 interfaces with the threaded tube 504, the threaded bolt 300 is rotated to tighten the threaded bolt 300 to the socket insert 500. In an exemplary embodiment, the end of the threaded bolt 300 extends from the exterior of the housing 230, such as beyond the bottom of the hub 250. The portion of the threaded bolt 300 that is exposed at the exterior of the housing 230 is the insulating cap 320. No metal or conductive portion of the threaded bolt 300 is exposed. As such, the first harness connector 200 is touch safe in the unmated state. Similarly, the end of the socket insert 500 may extend from the exterior of the housing 430, such as beyond the top of the hub 450. The portion of the socket insert 500 that is exposed at the exterior of the housing 430 is the insulating cap 520. No metal or conductive portion of the socket insert 500 is exposed. As such, the second harness connector 400 is touch safe in the unmated state. The cover assembly 530 covers the bottom end of the socket insert 500 further making the second harness connector 400 touch safe. Similarly, the insulating cover 310 covers the top end of the threaded bolt 300 making the first harness connector 200 touch safe. In an exemplary embodiment, the exposed portions at the terminating ends 208, 408 of the flat cables 202, 402 are contained or encapsulated within the housings 230, 430 further making the harness connectors 200, 400 touch safe.

During mating, the upper portion of the hub 450 of the second harness connector 400 is plugged into the lower portion of the hub 250 of the first harness connector 200. In the illustrated embodiment, the first harness connector 200 carries the mating seal 360 to interface with the hub 450 of the second harness connector 400 during mating. As such, a sealed interface is provided between the first and second harness connectors 200, 400. In an exemplary embodiment, other openings in the housings 230, 430 are sealed, such as by the bolt seal 330 and the cable seal 220 of the first harness connector 200 and the cover seal 534 and the cable seal 420 of the second harness connector 400.

While a single interface is illustrated in FIGS. 5 and 6, the harness connectors 200, 400 may have multiple interfaces. For example, each harness connector 200, 400 may include multiple hubs (for example, a pair of hubs) and corresponding threaded bolts/socket inserts 300/500.

Figure 7:
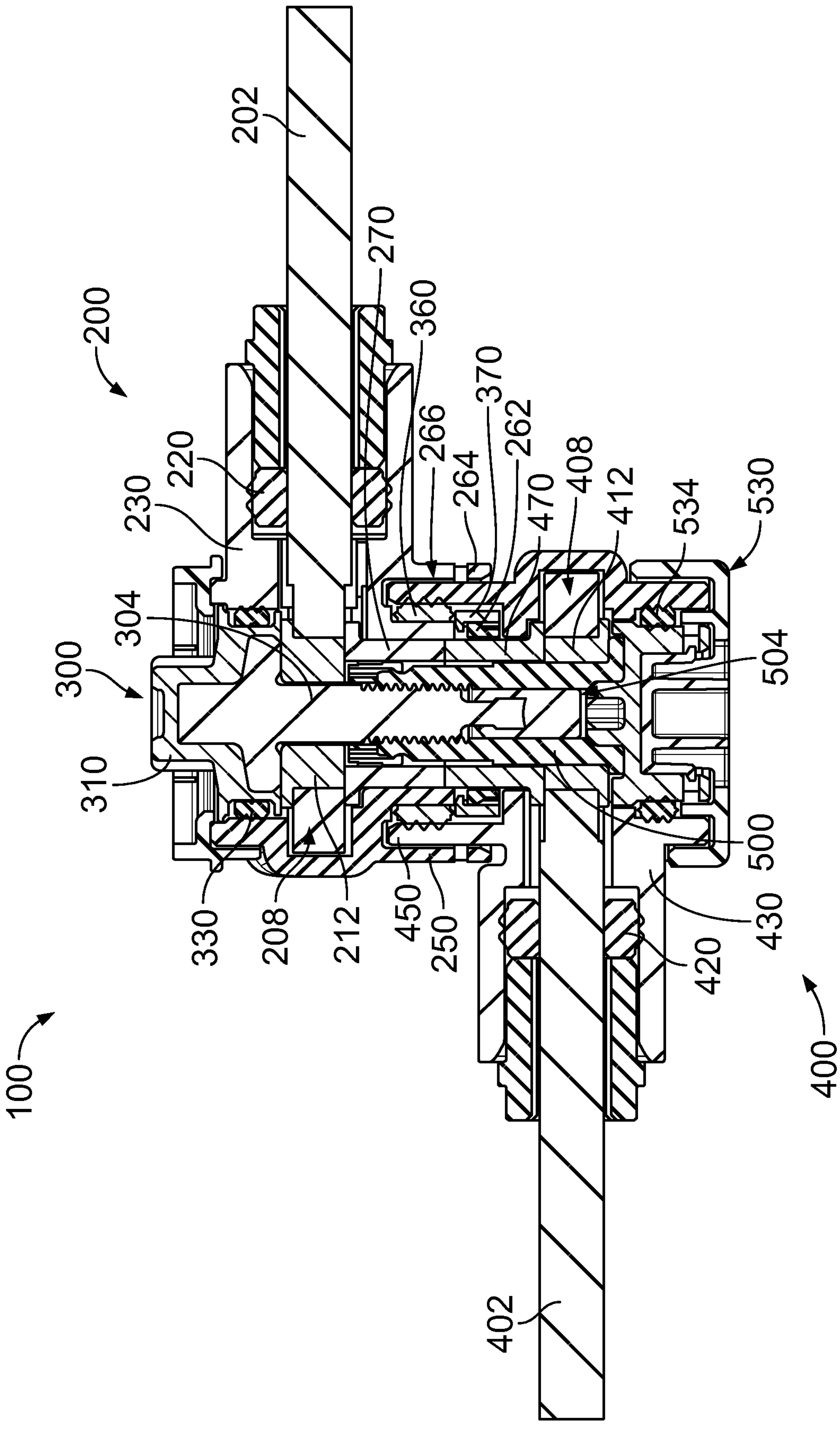
FIG. 7 is a cross-sectional view of the power system in accordance with an exemplary embodiment showing the first harness connector coupled to the second harness connector.

FIG. 7 is a cross-sectional view of the power system 100 in accordance with an exemplary embodiment showing the first harness connector 200 coupled to the second harness connector 400. When mated, the power system 100 is touch safe. The insulating cover 310 covers the top of the threaded bolt 300 such that no metal or conductive portion of the threaded bolt 300 may be touched from the exterior of the first harness connector 200. The cover assembly 530 covers the bottom of the socket insert 500 such that no metal or conductive portion of the socket insert 500 may be touched from the exterior of the second harness connector 400. The housings 230, 430 cover or enclose the terminating ends 208, 408 of the flat cables 202, 402 such that no metal or conductive portion of the flat cables 202, 402 may be touched from the exterior of the harness connectors 200, 400.

When mated, the power system 100 is sealed from the external environment. For example, the cable seals 220, 420 seal between the flat cables 202, 402 and the corresponding housings 230, 430. The bolt seal 330 seals between the threaded bolt 300 and the housing 230 at the top of the hub 250. The cover seal 534 seals between the cover assembly 530 and the housing 430 at the bottom of the hub 450. The mating seal 360 seals at the interface between the first and second harness connectors 200, 400. For example, the mating seal 360 is sealed to both of the housings 230, 430. In an exemplary embodiment, the hub 250 includes an inner hub ring 262 and an outer hub ring 264. A pocket 266 is formed between the inner hub ring 262 and the outer hub ring t264. The hub 450 of the second harness connector 400 is configured to be received in the pocket 266 between the inner and outer hub rings 262, 264. The mating seal 360 is received in the pocket 266 to interface with the hub 450 of the second harness connector 400. In the illustrated embodiment, the mating seal 360 is provided on the inner hub ring 262. The seal retainer 370 is coupled to the inner hub ring 262 to retain the mating seal 360 on the inner hub ring 262. The inner surface of the mating seal 360 is sealed to the inner hub ring 262 and the outer surface of the mating seal 360 is sealed to an interior surface of the hub 450. However, in alternative embodiments, the mating seal 360 may be provided on the outer hub ring 264 and seal against the exterior surface of the hub 450.

The threaded bolt 300 and the socket insert 500 are used to mechanically connect the first harness connector 200 to the second harness connector 400. For example, the threaded shaft 304 of the threaded bolt 300 is received in the bore of the threaded tube 504 of the socket insert 500. The threaded bolt 300 is rotated to tighten the threaded shaft 304 in the threaded tube 504. As the threaded bolt 300 is tightened, the first harness connector 200 is electrically connected to the second harness connector 400. For example, the threaded connection between the threaded bolt 300 and the socket insert 500 presses the contact ring 270 into electrical connection with the contact ring 470. The contact rings 270, 470 ring inserts 212, 412 of the flat cables 202, 402. The flat cables 202, 402 are electrically connected via the ring inserts 212, 412 and the contact rings 270, 470. In an exemplary embodiment, the contact rings 270 between the flat cables 202, 402. In an exemplary embodiment, the contact rings 270 are manufactured from copper and are highly conductive. In an exemplary embodiment, the ring inserts 212, 412 are manufactured from copper and are highly conductive. As such, and efficient power transmission path is created between the first and second harness connectors 200, 400. Because the mating interfaces of the first and second harness connectors 200, 400 are cylindrical the flat cables 202, 402 may be oriented at various angular orientations relative to each other. A compact, robust, sealed, vibration resistant, and touch safe electrical connection is made between the first and second harness connectors 200, 400.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power harness comprising:

a flat cable having a cable body extending to a terminating end, the flat cable including an opening and a ring insert received in the opening, the ring insert being electrically connected to the cable body, the flat cable including a cable seal surrounding and being sealed to the flat cable;

a housing having a chamber including a cable slot and a hub with a bore passing through the housing, the cable slot receives the terminating end of the flat cable, the ring insert being aligned with the bore, the housing having a mating end configured to be mated with a mating harness of the power harness;

a threaded bolt received in the hub and passing through the bore, the threaded bolt passing through the ring insert to threadably couple to the mating harness, the threaded bolt including a head and a threaded shaft, the threaded bolt including a bolt seal sealed between the threaded bolt and the housing;

a contact ring received in the hub and aligned with the ring insert in the bore, the contact ring having an opening between a first end and a second end, the first end engaging and being electrically connected to the ring insert, the second end configured to be electrically connected to the mating harness; and a mating seal configured to seal between the housing and the mating harness.

2. The power harness of claim 1, wherein the threaded bolt includes an insulating cover on the head and an insulating cap at a distal end of the threaded shaft, the bore being open at a top of the housing and open at a bottom of the housing, the insulating cover making the threaded bolt touch proof through the open top of the housing, the insulating cap making the threaded bolt touch proof through the open bottom of the housing.

3. The power harness of claim 2, wherein the insulating cap of the threaded bolt extends beyond an end of the housing to an exterior of the housing to mate with the mating harness.

4. The power harness of claim 1, wherein the bolt seal is sealed to the hub of the housing.

5. The power harness of claim 1, wherein the contact ring includes a flange engaging the housing to hold the contact ring in the bore.

6. The power harness of claim 1, wherein the threaded bolt compresses the contact ring into the mating harness when the threaded bolt is tightened.

7. The power harness of claim 1, wherein the flat cable includes a cable seal cap holding the cable seal on the terminating end of the flat cable, the cable seal cap being latchably coupled to the housing to hold the cable seal in the housing.

8. The power harness of claim 1, further comprising a bolt retainer coupled to the housing outward of the threaded bolt to retain the threaded bolt in the hub.

9. The power harness of claim 1, further comprising a mating seal retainer coupled to the housing to hold the mating seal in the housing.

10. The power harness of claim 1, wherein the hub includes an inner hub ring, an outer hub ring, and a pocket between the inner hub ring in the outer hub ring, the mating seal received in the pocket and sealed to the inner hub ring, the pocket configured to receive a mating hub of the mating harness to interface with the mating seal.

11. The power harness of claim 1, wherein the hub is cylindrical allowing a 360° mating orientation with the mating harness.

12. A power harness comprising:

a flat cable having a cable body extending to a terminating end, the flat cable including an opening and a ring insert received in the opening, the ring insert being electrically connected to the cable body, the flat cable including a cable seal surrounding and being sealed to the flat cable;

a housing having a chamber including a cable slot and a hub with a bore passing through the housing, the cable slot receives the terminating end of the flat cable, the ring insert being aligned with the bore, the housing having a mating end configured to be mated with a mating harness of the power harness;

a socket insert received in the hub and passing through the bore, the socket insert passing through the ring insert, the socket insert including a threaded bore configured to be threadably coupled to a threaded bolt of the mating harness;

a contact ring received in the hub and aligned with the ring insert in the bore, the contact ring having an opening between a first end and a second end, the first end engaging and being electrically connected to the ring insert, the second end configured to be electrically connected to the mating harness; and a cover coupled to the hub and holding the socket insert in the housing, the cover including a cover seal sealing coupled to the housing to seal the bore from the external environment.

13. The power harness of claim 12, wherein the socket insert includes an insulating cap at a distal end of the socket insert, the bore being open at a top of the housing and open at a bottom of the housing, the cover making the socket insert touch proof through the open bottom of the housing, the insulating cap making the socket insert touch proof through the open top of the housing.

14. The power harness of claim 13, wherein the insulating cap of the socket insert extends beyond an end of the housing to an exterior of the housing to mate with the mating harness.

15. The power harness of claim 12, wherein the contact ring includes a flange engaging the housing to hold the contact ring in the bore.

16. The power harness of claim 12, wherein the hub is cylindrical allowing a 360° mating orientation with the mating harness.

17. A power harness comprising:

a first harness connector including a first housing having a first hub with a first bore passing through the first housing, the first harness connector including a first flat cable having a terminating end received in the first housing, the first harness connector including a first cable seal sealed to the first housing and the first flat cable at the terminating end, the first harness connector including a threaded bolt received in the first hub and passing through the first bore, the first harness connector including a first contact ring received in the first hub and electrically connected to the first flat cable;

a second harness connector coupled to the first harness connector, the second harness connector including a second housing having a second hub with a second bore passing through the second housing, the second harness connector including a second flat cable having a terminating end received in the second housing, the second harness connector including a second cable seal sealed to the second housing and the second flat cable at the terminating end, the second harness connector including a socket insert received in the second hub and passing through the second bore, the socket insert including a threaded bore threadably coupled to the threaded bolt of the first harness connector, the second harness connector including a second contact ring received in the second hub and electrically connected to the second flat cable, the second harness connector including a cover coupled to the second hub and holding the socket insert in the second housing, the cover including a cover seal sealing coupled to the second housing to seal the second bore from the external environment; and a mating seal sealed between the first housing and the second housing at a mating interface between the first and second harness connectors.

18. The power harness of claim 17, wherein the first flat cable includes an opening in a cable body and a first ring insert received in the opening and electrically connected to the cable body, the second flat cable including an opening in a cable body and a second ring insert received in the opening and electrically connected to the cable body, the first contact ring engaging and electrically connected to the first ring insert, the second contact ring engaging and electrically connected to the second ring insert, the first and second ring inserts pressing the first and second contact rings together as the threaded bolt is threadably coupled to the threaded bore of the socket insert.

19. The power harness of claim 17, wherein the first and second harness connectors are both touch-proof both before and after coupling.

20. The power harness of claim 17, wherein the first and second harness connectors are completely sealed when mated.

* * * * *